(12) United States Patent
Xu

(10) Patent No.: US 12,075,940 B2
(45) Date of Patent: *Sep. 3, 2024

(54) BEVERAGE PREPARATION MACHINE

(71) Applicant: LAVAZZA PROFESSIONAL NORTH AMERICA, LLC, West Chester, PA (US)

(72) Inventor: Xianghua Xu, Basingstoke (GB)

(73) Assignee: Luigi Lavazza S.p.A., Turin (IT)

( * ) Notice: Subject to any disclaimer, the term of this patent is extended or adjusted under 35 U.S.C. 154(b) by 48 days.

This patent is subject to a terminal disclaimer.

(21) Appl. No.: 17/869,219

(22) Filed: Jul. 20, 2022

(65) Prior Publication Data

US 2022/0354297 A1 Nov. 10, 2022

Related U.S. Application Data

(63) Continuation of application No. 16/471,955, filed as application No. PCT/GB2017/053882 on Dec. 22, 2017, now Pat. No. 11,419,446.

(30) Foreign Application Priority Data

Dec. 23, 2016 (GB) ..................................... 1622102

(51) Int. Cl.
*A47J 31/36* (2006.01)
*A47J 31/46* (2006.01)
*A47J 31/52* (2006.01)

(52) U.S. Cl.
CPC ............. *A47J 31/36* (2013.01); *A47J 31/468* (2018.08); *A47J 31/52* (2013.01); *A47J 31/525* (2018.08)

(58) Field of Classification Search
CPC .......... A47J 31/36; A47J 31/402; A47J 31/46; A47J 31/52; A47J 31/525
See application file for complete search history.

(56) References Cited

U.S. PATENT DOCUMENTS

| | | | | |
|---|---|---|---|---|
| 5,309,820 A | * | 5/1994 | Baxter | G07F 13/065 D7/400 |
| 2006/0292012 A1 | * | 12/2006 | Brudevold | A47J 31/402 417/53 |
| 2011/0281000 A1 | | 11/2011 | Vergani | |

(Continued)

FOREIGN PATENT DOCUMENTS

| | | |
|---|---|---|
| CN | 1957841 A | 5/2007 |
| CN | 101374443 A | 2/2009 |

(Continued)

*Primary Examiner* — Reginald Alexander
(74) *Attorney, Agent, or Firm* — The Belles Group, P.C.

(57) ABSTRACT

The present invention provides a beverage preparation machine comprising a housing; a reservoir for containing a liquid, wherein the reservoir is situated within the housing; a dispensing outlet for dispensing the liquid; a pump situated between the reservoir and the dispensing outlet; a user input means situated on an outer surface of the housing; and a pump controller configured to operate the pump for conveying liquid from the reservoir to the dispensing outlet for dispensing the liquid, wherein the input means is capable of communicating with the pump controller in order to initiate an operation of the pump; and the pump controller is configured to operate the pump based on a characteristic of the previous operation of the pump.

20 Claims, 3 Drawing Sheets

(56) References Cited

U.S. PATENT DOCUMENTS

| | | | |
|---|---|---|---|
| 2015/0129039 A1 | 5/2015 | Mulvaney | |
| 2015/0327717 A1* | 11/2015 | Burrows | A47J 31/3628 |
| | | | 99/295 |
| 2018/0014689 A1* | 1/2018 | Burrows | A47J 31/56 |
| 2019/0053660 A1* | 2/2019 | Kroos | A47J 31/4489 |

FOREIGN PATENT DOCUMENTS

| | | |
|---|---|---|
| CN | 105979831 A | 9/2016 |
| EP | 2789276 A1 | 10/2014 |
| EP | 3028610 A1 | 6/2016 |
| EP | 3087881 A1 | 11/2016 |
| JP | H04-093380 U | 8/1992 |
| JP | H11-155734 A | 6/1999 |
| JP | 2004-06581 A | 3/2004 |
| JP | 2009-273683 A | 11/2009 |
| WO | WO 2005/023697 A1 | 3/2005 |

* cited by examiner

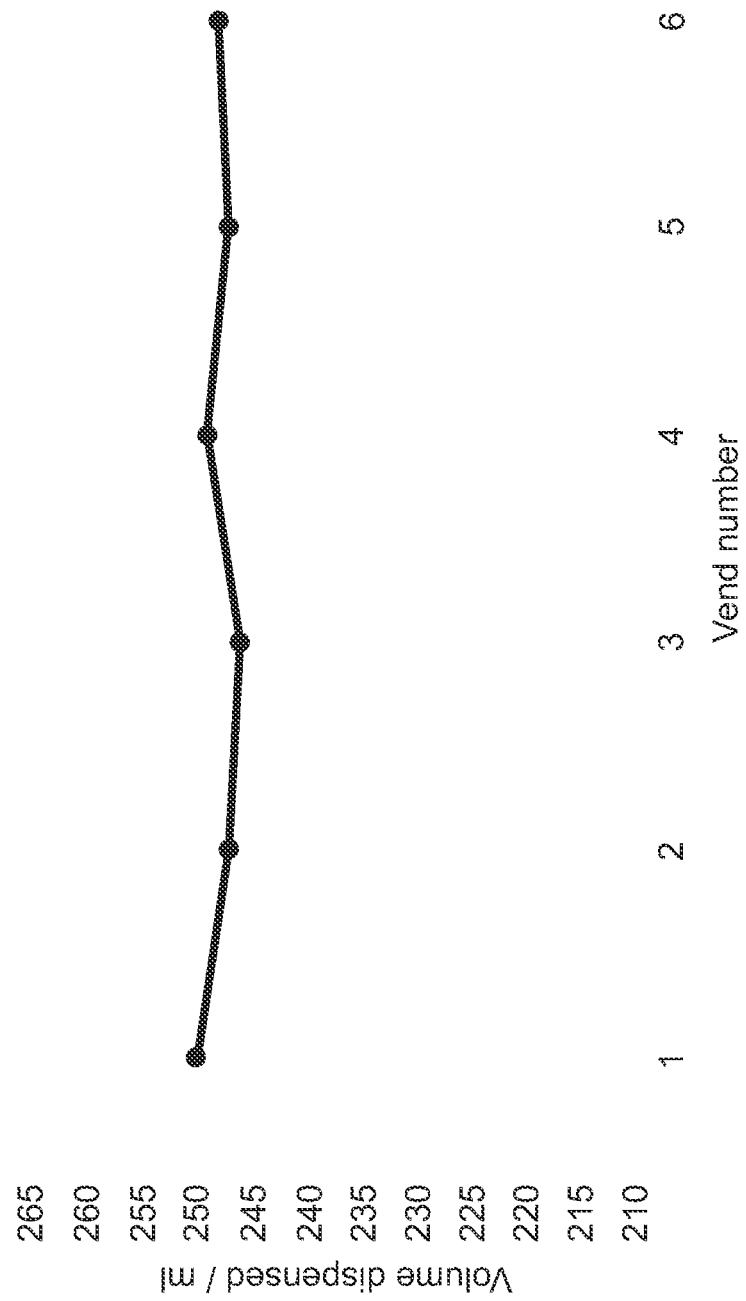

BEVERAGE PREPARATION MACHINE

CROSS REFERENCE TO RELATED APPLICATIONS

This application is a continuation of U.S. patent Application Ser. No. 16/471,955, filed on Jun. 20, 2019, which was the § 371 National Stage Entry of Patent Cooperation Treaty (PCT) Application No. PCT/GB2017/053882, filed on Dec. 22, 2017, the entire contents of both of which are hereby incorporated by reference herein, for all purposes.

DETAILED DESCRIPTION

The present invention relates to a beverage preparation machine and a method for operating the beverage preparation machine.

Beverage preparation machines are required to dispense defined quantities of liquid either directly into a vessel (such as a cup), or into a beverage preparation package in order to prepare a beverage (such as coffee or tea). In the latter case, the prepared beverage can then be subsequently dispensed into a vessel. The ability to dispense consistent volumes of liquid (referred to herein as a vend) is important so that the user can be confident of the volume of liquid that is going to be dispensed into the vessel. This avoids potential mess associated with a greater than expected volume or the disappointment associated with a less than expected volume.

The consistency of the dispensed volume is particularly important in relation to beverage preparation machines that provide the liquid to a beverage preparation package. The beverage preparation package is designed for use with a defined volume of liquid in order to produce the optimum final beverage. Variability in the dispensed volume can lead to variability in the quality of the final beverage and consumer dissatisfaction.

In the prior art, the beverage preparation machines use a flowmeter that monitors the fluid being dispensed from the beverage preparation machine. This flowmeter can feedback the volume of liquid that has been dispensed and thus ensure that the dispensing of the liquid occurs until the correct volume has been dispensed. The presence of a flowmeter contributes to a consistent vend but adds to the cost of the beverage preparation machine.

The present inventors have found that the volume of liquid dispensed from a beverage preparation machine that utilises a pump can vary based on the operational history of the pump. This is demonstrated by FIG. 1. FIG. 1 depicts the volume of liquid that is dispensed from a beverage preparation machine that was vended 21 times in a row, each vend directly after the last. It can be seen that the volume of the dispensed liquid steadily decreases with each vend even though the operational parameters of the pump are kept constant.

It is therefore an aim of the present invention to provide a beverage preparation machine with a consistent vend volume but with a reduced cost and/or complexity of construction.

Accordingly, the present invention provides a beverage preparation machine comprising: a housing; a reservoir for containing a liquid, wherein the reservoir is situated within the housing; a dispensing outlet for dispensing the liquid; a pump situated between the reservoir and the dispensing outlet; a user input means situated on an outer surface of the housing; and a pump controller configured to operate the pump for conveying liquid from the reservoir to the dispensing outlet for dispensing a liquid, wherein the input means is capable of communicating with the pump controller in order to initiate an operation of the pump; and the pump controller is configured to operate the pump based on a characteristic of the previous operation of the pump.

In this way, the pump controller is able to adjust the operation of the pump based on the previous operation of the pump. This enables an increase in the consistency of the dispensed volume from the beverage preparation machine without the need for a flowmeter.

In particular, the beverage preparation machine may not comprise a flowmeter for measuring the volume of liquid conveyed from the reservoir to the dispensing outlet. Preferably, the beverage preparation machine does not comprise a flowmeter at all.

The beverage preparation machine is capable of providing discrete volumes of liquid, either for preparing a beverage within the beverage preparation machine or for preparing a beverage externally to the beverage preparation machine.

The beverage preparation machine has a housing. The form of the housing is not particularly limited so long as it performs the basic function of housing beverage preparation machine components. The housing can be formed of plastic and/or metal material.

The beverage preparation machine has a reservoir for containing a liquid. For example, the reservoir may have an internal volume of 1 L or more, 2 L or more, or 5 L or more. The beverage preparation machine can then be filled with sufficient liquid for multiple discrete vends. In this way, the beverage preparation machine does not need to be connected to a water supply. Where the beverage preparation machine is connected to a water supply, the reservoir may be relatively smaller and simply be a region where the liquid is held prior to being pumped for dispensation.

The dispensing outlet of the beverage preparation machine is connected to the reservoir such that liquid can be conveyed from the reservoir to the dispensing outlet. The beverage preparation machine may comprise pipes or tubing suitable for conveying liquid connecting the reservoir to the outlet. The dispensing outlet may be in the form of a liquid injection needle. This form allows the outlet to pierce a beverage preparation package when a beverage preparation package is utilised with the beverage preparation machine. The dispensing outlet may be made from metal.

As noted above, a pump is situated between the reservoir and the dispensing outlet. In this way, the pump can be operated in order to convey liquid from the reservoir to the outlet when dispensing.

When dispensing is not required the pump does not operate and liquid is not conveyed from the reservoir to the outlet. The beverage preparation machine may have additional valves that ensure liquid is not conveyed when dispensing is not required.

The form of the pump is not particularly limited. However, the pump is typically one which exhibits a varying efficiency based on its operation history. Such a pump may be a reciprocating positive displacement pump. In particular, the reciprocating positive displacement pump may comprise a shuttle mechanism. It has been found that the present invention is particularly useful for a reciprocating positive displacement pump with a shuttle mechanism and especially one that utilises a change in magnetic field for causing the reciprocating action. Such a pump has been shown to have an efficiency that decreases with multiple operations in the beverage preparation machine.

The user input means situated on the outer surface of the housing provides a way for the user to control the beverage preparation machine. The user input means may be in the form of at least one button. The at least one button can be used to initiate the dispensation of the liquid. The user input means may comprise a plurality of buttons that are capable of initiating different forms of dispensation of the beverage preparation machine. For example one button may be used for a relatively small volume dispensation while another button may be used for a relatively large volume dispensation. Alternatively, the user input means may be in the form of a touch pad which may contain multiple options for the user.

The operation of the pump in the beverage preparation machine is controlled by a pump controller. The pump controller is capable of receiving a signal from the input means and then operating the pump accordingly to provide the required volume of liquid. The pump controller is configured to store aspects of the operational history of the pump and to adjust the control of the pump operation accordingly. In this way, the pump controller is able to adjust the operating parameters of the pump so as to compensate for expected variability in the dispensed volume of liquid. The pump controller is programmed with the required operational changes for compensating volume variability. This avoids the need for feedback from the machine and negates the need for the flowmeter that is utilised in the prior art.

Various characteristics of the operational history of the pump may affect the subsequent dispensed volume. One particular aspect of the previous operation of the pump that may affect the vending volume is the time that has elapsed since the previous operation of the pump. It is been found that the performance of pumps can exhibit a form of hysteresis. In other words, the efficiency of the pump can decrease with use and then only recover after a sufficient resting time. Therefore, the time that has elapsed since the previous operation of the pump is an important parameter that will affect the volume that will be vended for a given operation time of the pump.

The pump controller can be configured to account for this characteristic. For example, if the time that has elapsed since the previous operation of the pump is below a critical value then the pump controller can be configured to adjust the next operation of the pump so as to compensate for the expected efficiency decrease of the pump. Alternately, if the time elapsed is greater than the critical value, the pump controller may be configured to operate the pump with the same parameters as the previous pump operation. This accounts for the hysteresis of the pump and acknowledges that there may be a particular time frame over which the pump will recover its efficiency. The critical time may be, for example, 30 seconds, may be one minute, may be two minutes, may be four minutes, or may be five minutes. Typically, the critical time is a time within the range of from about 10 seconds to about 5 minutes, typically no more than about 4 minutes, typically no more than about 3 minutes. The particular critical time will depend on the specific configuration of the beverage preparation machine.

The pump controller can also be configured to take into account the time that has elapsed between each of a plurality of previous operations of the pump. For example, the pump controller may take into account the time that has elapsed between the last two operations of the pump, or each of the last three operations of the pump, or each of the last four operations of the pump, or each of the last five operations of the pump, alternatively each of the last six, seven, eight, or nine or more operations of the pump. In this manner, multiple recent operations, that wouldn't have allowed the full recovery of the efficiency of the pump and instead result in an accumulative decrease in the efficiency of the pump can be compensated for. For example, if the last four previous operations of the pump had a time that has elapsed between each of them of less than the critical value then a different operation of the pump may be required compared to the scenario where only the previous two operations of the pump had a time that has elapsed between each of them which was less than the critical value.

The operation of the pump may be adjusted based on the frequency of a plurality of previous operations of the pump. This again can take account of the accumulative effect of multiple recent dispensations. In this way, the pump controller may be configured to account for the time frame over which the previous operations of the pump (for example 5 operations) have occurred and so create an average frequency for those previous operations and adjust the next operation of the pump accordingly. Conversely, the pump controller may be configured to account for the number of operations that have occurred in a previous defined time period. For example, if five vends have occurred in the last four minutes then a different operation of the pump may be required compared to the scenario where only two vends had occurred in the last four minutes. The previous defined time period can be a time period in the range of from about 10 seconds to about 5 minutes, for instance one minute, two minutes, three minutes, four minutes or five minutes, or a different time period depending on the configuration of the beverage preparation apparatus. Again, this allows compensation for the accumulative effect of multiple recent vends.

The pump controller can be configured to take account of various combinations of historical operational data. For example, the pump controller can be configured to account for both the time that has elapsed since the previous operation and the frequency of a plurality of previous operations and so compensate accordingly for the relative effects of these two aspects.

The decrease in efficiency with each variable can be investigated empirically and may be dependent on the particular beverage preparation machine configuration that is utilised. The effect of these variables may be observed and the pump controller configured accordingly to compensate for the efficiency effects of these variables. This can have a varying degree of complexity. For example, a simple adjustment that is only based on a time that has elapsed since the previous operation of the pump will advantageously provide a degree of compensation and so will be beneficial. However, if further increases in consistency are required then additional variables can be taken into account such as the time that has elapsed between a plurality of previous operations of the pump.

As noted above, the pump controller is configured to operate the pump according to a characteristic of the previous operation of the pump. In this way, the pump controller is able to vary an operational parameter of the pump based on the characteristic of the previous operation of the pump.

That operational parameter may be the time that the pump is operated for. For example, if it has been found that the pump efficiency decreases with an increasing amount of recent dispensations (for instance within a defined time period), then the pump controller can be configured to increase the time of operation of the pump based on the recent dispensations so as to ensure the same volume of liquid is conveyed from the reservoir to the outlet for each vend regardless of the operational history of the pump. As noted above, the amount of time compensation that is required can be investigated empirically and the pump controller can then be programmed accordingly.

A further parameter of the operation of the pump that can be controlled by the pump controller is the speed of operation of the pump. Again, if it is found that the flow rate of the liquid being conveyed from the reservoir to the outlet decreases with multiple recent dispensations, even though the speed of the pump remains the same, then the speed of the pump may be increased in order to compensate for this loss of efficiency. Again, this can be investigated empirically and the required level of compensation, i.e. speed increase, can be determined.

A parameter of the operation of the pump that can be controlled by the pump controller may be an electrical parameter. The pump controller can vary the voltage that is supplied to the pump. Alternatively or additionally, the pump controller can vary the current that is supplied to the pump. In this way, the operation of the pump can be adjusted in order to compensate for a loss of efficiency.

In a related manner, the pump controller may be configured to vary the power that is supplied to the pump. Again, in this way any loss of efficiency in the operation of the pump can be compensated by increasing the power of pump operation.

It is possible for the pump controller to vary just one of the pump's operational parameters or vary a plurality of the pumps operational parameters, as required.

The present invention is particularly useful for beverage preparation machines that prepare a beverage in a beverage preparation package. As noted above, the quality of the resulting beverage is dependent on the volume of liquid that is provided. Therefore, a consistent volume will result in a consistent desired quality of beverage.

The beverage preparation machine of the present invention may have a package receiving means for receiving a beverage preparation package that contains beverage preparation ingredient, wherein the dispensing outlet is configured to dispense the liquid into the beverage preparation package when the beverage preparation package is present in the package receiving means.

The package receiving means is capable of holding a beverage preparation package so that the dispensing outlet can inject the liquid into the package. This allows the preparation of the beverage within the package, since the package contains the beverage preparation ingredient. The beverage preparation ingredient may be coffee grounds, tea leaves, or chocolate powder etc. The prepared beverage will then leave the beverage preparation package, as is conventional in the art.

The beverage preparation machine may comprise a beverage container receiving station for receiving a beverage container, wherein the beverage preparation machine is configured so that when the beverage container is present in the beverage container receiving station, it is capable of receiving a beverage from the beverage preparation package when the beverage preparation package is present in the package receiving means. In this way the beverage preparation machine can be used so as to prepare the beverage and then allow the beverage to be conveyed to a beverage container for the user to then consume the beverage.

The present invention also provides a method for operating a beverage preparation machine of the present invention, comprising the steps of: initiating a first operation of the pump; and initiating a second operation of the pump after a first time period; wherein the second operation of the pump is controlled on the basis of a characteristic of the first operation of the pump.

This method allows the second operation of the pump to be compensated when required based on the first operation of the pump. In this manner, the consistency in the dispensed volume can be increased.

When the first time period is less than a critical value, the second operation of a pump may be different to the first operation of the pump. This accounts for the hysteresis in the performance of the pump based on recent operational history.

In order to compensate for the recent operational history, as noted above, the second operation of the pump may be for a longer time than the first operation of the pump, and/or at a higher speed than the first operation of the pump, and/or at a higher power than the first operation of the pump. In this way, the operation of the pump is adjusted so as to increase the consistency of the dispensed volume of liquid.

The aspects of the beverage preparation machine described above can be utilised with the method of the present invention.

The present invention will now described with reference to the following drawings.

FIG. 3 depicts a graph of the dispensed volume with continuous vends for a beverage preparation apparatus of the present invention.

Figure 2:
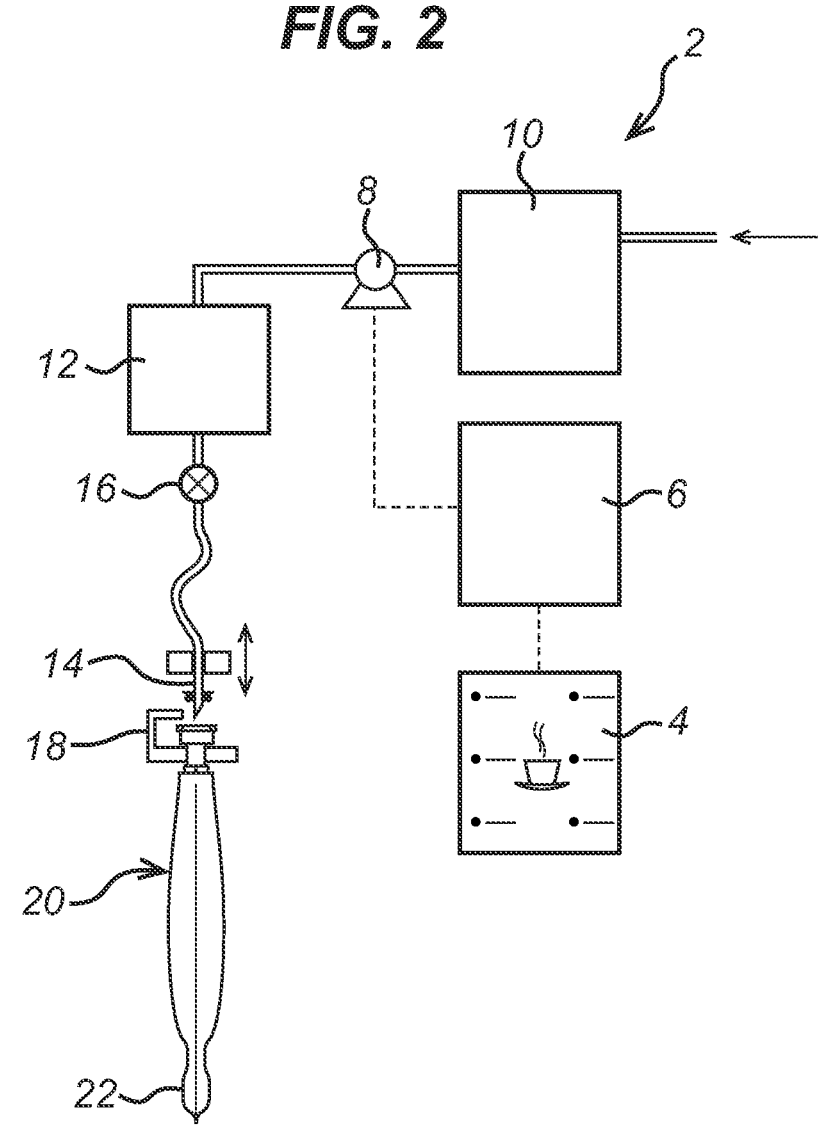
FIG. 2 depicts a schematic diagram of beverage preparation apparatus of the present invention.

A beverage preparation apparatus of the present invention is depicted in a schematic manner in FIG. 2. The beverage preparation apparatus 2 comprises a user input means 4 in the form of a touch panel. The user input means 4 is connected to the pump controller 6 such that electrical signals can be communicated to the pump controller 6. The pump controller 6 controls pump 8 by being connected to the pump 8 so that electrical signals can be conveyed. Pump 8, when operating, conveys liquid from reservoir 10 to heater 12 and through to outlet 14. In this manner, the pump controller 6 can operate pump 8 so as to provide liquid from the reservoir 10 to be dispensed from outlet 14. The presence of heater 12 allows the water to be heated as it passes on its way to the outlet in order to produce hot beverages when desired. The tubing present between the pump 8 and the outlet 14 additionally has a valve 16 that can prevent undesired flow of liquid out of the outlet.

The beverage preparation apparatus 2 has a package receiving means 18 that retains a beverage preparation package 20. The outlet 14 is in the form of a needle that can pierce the top of the beverage preparation package 20 and so provide liquid directly into the beverage preparation package. The beverage preparation package has a heat sensitive seal on its lower edge 22 that can open under the action of the hot water that is injected into the beverage preparation package 20. In this way, the beverage can exit the beverage preparation package.

The beverage preparation machine has a beverage container receiving station 24 that can receive beverage container 26. The cup receiving station 24 ensures that the user places the beverage container 26 in the correct location to receive the prepared beverage from beverage preparation package 20.

The pump controller 6 is programmed to vary the operational time of pump 8 based on the operational history of pump 8.

An approach that is of general applicability and is not limited to the particular setup of FIG. 2 (but can be utilised with this setup) will now be described.

The pump controller 6 operates pump 8 for a time (Vend time) dictated by the following equation:

Vend time (secs)=$T_{fixed}$+T1+T2+T3

Wherein $T_{fixed}$ is a baseline operational time for the pump, T1 is any adjustment to the vend time introduced during initial calibration of the beverage preparation apparatus, T2 is the time dictated by the user input from user input panel 4 (an optionally longer time for a larger required volume), and T3 is any volume variability compensation time that is based on the operational history of the pump 8.

Therefore, in the present example, the pump compensation is carried out by adjusting the operational time of the pump, although, as acknowledged above, other operational parameters of the pump may be varied.

Figure 1:
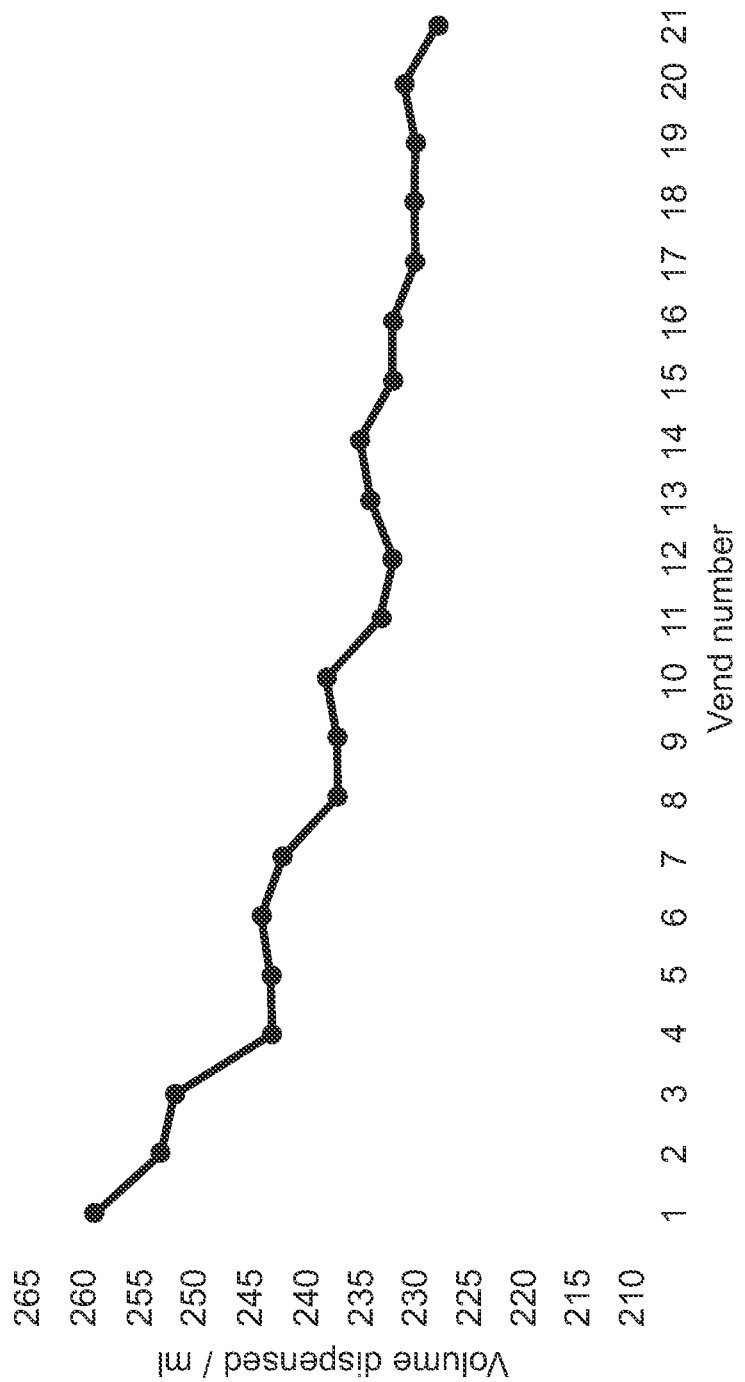
FIG. 1 depicts the variation in dispensed liquid volume with number of consecutive vends in a machine without a compensation mechanism.

In order to compensate for the decreasing vend volume depicted in FIG. 1, the following empirical compensation approach was formulated.

If the pump has not been operated for more than four minutes, then T3 in equation above is set at 0 and no compensation for recent operation is required. Whereas if a previous vend has occurred in the last four minutes then an adjustment factor is required. Accordingly, T3 was empirically found to be as follows:

T3=N×0.4 (N<10).

Wherein N is the number of vends that have occurred in the previous four minutes up to a maximum value of 9. Accordingly, 0.4 seconds is added for each vend that has occurred in the previous four minutes.

The effect of applying this compensation mechanism can be appreciated by comparing FIGS. 1 and 3. FIG. 3 depicts the volume dispensed with continuous vends with the compensation mechanism compared to the exact same setup without the compensation mechanism reported in FIG. 1. It can be seen that the compensation mechanism significantly increases the consistency of the dispensation of liquid without the need for a flowmeter.

The foregoing description describes aspects of the invention but should not be considered limiting. The invention is defined in the following claims.

The invention claimed is:

1. A beverage preparation machine comprising:
a housing;
a reservoir for containing a liquid;
a dispensing outlet for dispensing the liquid;
a pump situated between the reservoir and the dispensing outlet; and
a pump controller configured to operate the pump for conveying the liquid from the reservoir to the dispensing outlet for dispensing the liquid; and
the pump controller is configured to operate the pump based on a characteristic of a previous operation of the pump, the characteristic of the previous operation of the pump comprising a frequency of a plurality of previous operations of the pump.

2. The beverage preparation machine of claim 1, wherein the characteristic of the previous operation of the pump further comprises a time that has elapsed since the previous operation of the pump.

3. The beverage preparation machine of claim 2, wherein the characteristic of the previous operation of the pump further comprises a time that has elapsed between each of a plurality of previous operations of the pump.

4. The beverage preparation machine of claim 1, wherein the pump controller is further configured to vary the time of operation of the pump based on the characteristic of the previous operation of the pump.

5. The beverage preparation machine of claim 1, wherein the pump controller is further configured to vary the speed of operation of the pump based on the characteristic of the previous operation of the pump.

6. The beverage preparation machine of claim 1, wherein the pump controller is further configured to vary an electrical parameter of the pump based on the characteristic of the previous operation of the pump.

7. The beverage preparation machine of claim 1, wherein the pump controller is further configured to vary the power of operation of the pump based on a characteristic of the previous operation of the pump.

8. The beverage preparation machine of claim 1, further comprising a package receiving means for receiving a beverage preparation package that contains beverage preparation ingredient, wherein the dispensing outlet is configured to dispense the liquid into the beverage preparation package when the beverage preparation package is present in the package receiving means.

9. The beverage preparation machine of claim 8, further comprising a cup receiving station for receiving a beverage container, wherein the beverage preparation machine is configured so that the beverage container in the cup receiving station is capable of receiving a beverage from the beverage preparation package when the beverage preparation package is present in the package receiving means.

10. The beverage preparation machine of claim 1, wherein the beverage preparation machine does not comprise a flowmeter for measuring the volume of liquid conveyed from the reservoir to the dispensing outlet.

11. The beverage preparation machine of claim 1, wherein the pump controller is further configured to vary the speed of operation of the pump based on the characteristic of the previous operation of the pump.

12. A beverage preparation machine comprising:
a housing;
a reservoir for containing a liquid;
a dispensing outlet for dispensing the liquid;
a pump situated between the reservoir and the dispensing outlet; and
a pump controller configured to operate the pump for conveying the liquid from the reservoir to the dispensing outlet for dispensing the liquid; and
the pump controller is configured to operate the pump based on a characteristic of a previous operation of the pump, wherein the pump is a reciprocating positive displacement pump that comprises a shuttle mechanism.

13. The beverage preparation machine of claim 12, wherein the reservoir is situated within the housing.

14. A method for operating a beverage preparation machine, the beverage preparation machine comprising:
a housing;
a reservoir for containing a liquid;
a dispensing outlet for dispensing the liquid;
a pump situated between the reservoir and the dispensing outlet; and
a pump controller configured to:
operate the pump for conveying the liquid from the reservoir to the dispensing outlet for dispensing the liquid; and operate the pump based on a characteristic of a previous operation of the pump, the method comprising the steps of:

initiating one or more operations of the pump; and initiating at least a further operation of the pump after a first time period;

wherein the further operation of the pump is based on a characteristic of the one or more operations of the pump, the characteristic of the one or more operations of the pump comprising a frequency of a plurality of the one or more operations of the pump.

15. The method of claim 14, wherein when the first time period is less than a critical value, the further operation of the pump is different from the one or more operations of the pump.

16. The method of claim 15, wherein the further operation of the pump is for a longer time than the one or more operations of the pump.

17. The method of claim 15, wherein the further operation of the pump is at a higher speed than the one or more operations of the pump.

18. The method of claim 15, wherein the further operation of the pump is at a higher power than the one or more operations of the pump.

19. The beverage preparation machine of claim 1, wherein the reservoir is situated within the housing.

20. The method of claim 14, wherein the reservoir is situated within the housing.

\* \* \* \* \*